United States Patent [19]

de Groot et al.

[11] 4,274,662

[45] Jun. 23, 1981

[54] PYROTECHNICAL WELDING SLEEVE CONNECTOR FOR THE JOINING OF MOLDED COMPONENTS, ESPECIALLY PIPES, OF A THERMOPLASTIC SYNTHETIC RESIN

[75] Inventors: Willem J. de Groot, Jona, Switzerland; Horst Penner, Furth; Irene Schmied, Nuremberg, both of Fed. Rep. of Germany; Peter Weber, Jona, Switzerland

[73] Assignees: Dynamit Nobel AG, Troisdorf, Fed. Rep. of Germany; Geberit AG, Rapperswil, Switzerland

[21] Appl. No.: 107,861

[22] Filed: Dec. 28, 1979

[30] Foreign Application Priority Data

Dec. 30, 1978 [DE] Fed. Rep. of Germany ....... 2856895

[51] Int. Cl.³ .......................................... F16L 47/02
[52] U.S. Cl. ..................................... 285/21; 285/292; 285/382.2; 285/423
[58] Field of Search .................. 285/21, 22, 423, 381, 285/382.2, 382.1, 382.4, 382.5, 369, 292; 29/421 E; 264/261, 263

[56] References Cited

U.S. PATENT DOCUMENTS

| 3,094,452 | 6/1963 | Von Riegen et al. ............. 285/21 X |
| 3,206,537 | 9/1965 | Steward .............................. 285/21 X |
| 3,378,672 | 4/1968 | Blumenkranz ..................... 285/21 X |
| 3,542,402 | 11/1970 | Caples .................................... 285/21 |

FOREIGN PATENT DOCUMENTS

| 808725 | 2/1959 | United Kingdom ...................... 285/21 |
| 143282 | 3/1961 | U.S.S.R. .................................. 285/21 |

Primary Examiner—Thomas F. Callaghan
Attorney, Agent, or Firm—Craig & Antonelli

[57] ABSTRACT

A welding sleeve connector for the connection of molded components made of a thermoplastic synthetic resin employs the heat energy generated by pyrotechnical material. This connector has a thermoplastic sleeve and a plurality of pyrotechnical heating charges for producing the welding heat energy. Each charge is individually enclosed in a casing of a solid material arranged in the sleeve, and the encased heating charges are separately positioned in the sleeve at predetermined spacing from each other over the circumference of the sleeve. The connector also has a device for igniting the heating charges.

10 Claims, 6 Drawing Figures

PYROTECHNICAL WELDING SLEEVE CONNECTOR FOR THE JOINING OF MOLDED COMPONENTS, ESPECIALLY PIPES, OF A THERMOPLASTIC SYNTHETIC RESIN

The invention relates to a pyrotechnical welding sleeve connector or assembly for joining of molded thermoplastic components, especially pipes which employs the heat of a pyrotechnical charge to weld the components together.

In the so-called sleeve welding process, the connection between, for example, two pipe ends of a thermoplastic synthetic resin and a tubular sleeve likewise of thermoplastic material and extending over both ends is attained by heating the outer wall surfaces of the pipe ends and the inner wall surface of the sleeve to the welding temperature by supplying heat thereto, and joining these parts flat to one another. In this connection, it is known from U.S. Pat. No. 3,542,402 to produce the welding energy by means of pyrotechnical heating charges. Each pipe end is coordinated with a heating charge enclosed in an annular metallic tube, i.e. in an annular envelope of a solid material. The annular metallic tube is, in turn, entirely enclosed within the sleeve in such a way that it encompasses the pipe end to be welded to the sleeve.

The use of pyrotechnical heating charges for the welding together of thermoplastic molded components requires the maintenance of certain standards with regard to the pyrotechnical charge. These are:

1. A high heat of conversion per unit volume of the charge, in order to be able to realize a small constructional volume of the sleeve.
2. A low conversion or reaction temperature of the charge to avoid thermal damage to the thermoplastic material.
3. A low reaction velocity of the charge to avoid overheating of the sleeve material on account of accumulated heat.
4. A small evolution of gas from the pyrotechnical heating charge or from the sleeve during combustion, in order to avoid damage to the connecting elements and/or inconvenience or injuries to the assembly personnel.

These standards or requirements normally cannot be met entirely by pyrotechnical heating charges without the use of a solid casing. Thus, for example, the desire for a heating charge which, at low reaction temperatures, can transmit a high amount of heat of conversion can be realized only within relatively narrow limits. Low reaction velocities meet with great difficulties if, at the same time, a ready ignitability and a complete reaction capability of the heating charge are desired. The gas production by the heating charge during combustion is essentially a function of the charge composition and of the binder. Small amounts of gas are obtained with the use of inorganic binders. However, such binders are extensively precluded from use since they lead to a mechanical brittleness of the heating charge. For this reason, heating charge elements from these materials, which are safe in handling, can be manufactured only with difficulties, and furthermore they cannot be integrated into the sleeve. Organic binders, in contrast thereto, result in more flexible molded elements made from the pyrotechnical composition. These elements, however, burn up under strong smoke and gas formation and must be rejected for this reason.

Although, in principle, these requirements can be fulfilled by means of an arrangement according to U.S. Pat. No. 3,542,402, i.e. by enclosing the heating charges in an annular metallic tube, a prerequisite here is a pyrotechnical heating charge having a density uniform over the entire length of the annular metallic tube. However, such a homogeneous accommodation of the pyrotechnical material causes considerable practical difficulties due to the comparatively small inside cross section of the metallic tube and the length of the tube, which is very large as compared to its cross section, so that irregularities in the charge column or body cannot be excluded.

These irregularities can be further increased, for example, due to vibration or shock stresses during transport, handling, or the like, so that in certain cases fissures, cavities, or the like can also occur in the charge column. Thus, under practical conditions, disturbances or even interruptions in the combustion of the heating charge, with corresponding consequences for the welding process, cannot be reliably prevented. A further disadvantage in this arrangement is the fact that the diameter of the annular metallic tube must be adapted to the respective thermoplastic sleeve diameter, i.e. different-length metallic tubes are required for the various sleeve sizes.

The invention is based on the object of especially avoiding the aforementioned disadvantages in a welding sleeve connection or assembly for connecting thermoplastic components together, i.e. of constructing the sleeve connector in such a way that, with a minimum of expenditure, it is reliable also for varying sleeve sizes in its function and results in flawless welding connections of molded components made of a thermoplastic synthetic resin. The molded components include, in particular, pipes, but they can also be branching sections, e.g. tees, vessel connections, rods, or the like. The sleeve can be integrally molded to the end of a pipe, to the branches of a branching section, etc. In particular, the connector sleeve that includes a thermoplastic component is fashioned as a double socket which can be welded as a separate component to respectively one end of two pipes or the like.

This object has been attained according to the invention by a sleeve connector construction which comprises a tubular thermoplastic sleeve, a plurality of separate heating charges of pyrotechnical material, each charge being enclosed in a separate container and the heating charges being spaced around the circumference of the sleeve and means for igniting each of said heating charges. The containers for enclosing the heating charges are elongated tubular elements preferably unilaterally sealed tubes.

The tubes for enclosing the heating charges can be made, for example, of copper, iron, aluminum, or alloys thereof. However, other metals or nonmetallic materials, e.g. ceramic materials, can be utilized as well. Preferably, the tubes are made of materials having a high specific heat absorption capacity. Each tube forms an enclosure that acts as "heat accumulator." During combustion of the pyrotechnical mixture the enclosure absorbs considerable amounts of heat. Consequently, the high reaction temperature of the charge is reduced to a measure tolerable for the synthetic resin forming the sleeve, a direct contact of the hot charge with the thermoplastic sleeve material is avoided, and the heat transfer to the point where welding takes place is slowed down. Moreover, there is the possibility to utilize high-energy heating charges, i.e., to decrease the space requirement of the pyrotechnical charge elements, and to enclose the charge proper within the tube free of any binder, whereby the gas evolution during the reaction can be decisively reduced.

The tubes can be open at both ends; in this connection, for reducing the thermal stress on the synthetic resin of the sleeve, a heat-protective cover can optionally be provided for the tube end or ends, for example in the form of a ceramic disk contacting the tube end. Preferably, the tubes are, however, fashioned as unilaterally closed, i.e. sealed, small tubes. The tubes are furthermore preferably cylindrical. The pyrotechnical heating charge filled into the tubes can be completely uniformly compacted therein by the use of pressure. Insofar as the heating charges contain an addition of binder, for example, the compacting can optionally also be effected by the use of heat in addition to or in place of the utilization of pressure. Optionally, the provision can also be made to cover, after the filling step, the open end of the tubes or, in case of bilaterally open tubes, the ignition side thereof, with a primer composition to obtain an easier ignition of the heating charge. Thereby a trouble-free, reproducible burning of the heating charges, a prerequisite for flawless welding results, in ensured under all circumstances. The distribution of the tube over the circumference of the sleeve is dependent on the welding energy required in the welding area. For sleeves having a relatively large diameter, the same tubes can advantageously be employed as in case of smaller sleeves, except that the number of such tubes is correspondingly larger. Thus, with a comparatively minor expenditure, the reliable sleeve welding of molded synthetic resin components is ensured.

The wall thickness of the tubes should not be too small, so as not to unnecessarily reduce the effect of the heat accumulation. Wall thicknesses of between about 1.0 and 1.5 mm. have proved to be advantageous. Also, the proportion of length of heating charge to inside diameter of the tubes should not be selected to be too large, because the exact filling and compacting of the heating charge can otherwise cause difficulties. Therefore, tubes are preferably employed, the dimensions of which are such that the ratio of the range of the length to the range of the outer diameter to the wall thickness is (10 to 40):(4 to 10):1. In this connection, the outside length as well as the outer diameter are based on the wall thickness as the fundamental magnitude.

The tubes of this invention can be integrated into the sleeves directly during the manufacture thereof, for example by the injection-molding method. However, preferably the tubes are mounted in the sleeve after its manufacture by providing the sleeve with preferably axially parallel recesses, bores, or the like, emanating from the end face of the sleeve or, in case of a double socket, from its two end faces and being distributed at uniform mutual spacings over the circumference of the sleeve. The tubes are inserted in these recesses without radial play, if possible. Besides, an annular sealing element e.g. an O-ring, is preferably provided between the sleeve and the molded component to be welded into place; especially this sealing element is embedded in the inner surface of the sleeve. However, it is also possible and has turned out to be advantageous to arrange the recesses obliquely inclined to the axis of the sleeve so that the tubes, after insertion, form a zig-zag line. Thereby a coherent welding seam can be achieved which, for example, connects a pipe butt joint not only mechanically but also provides a leakproof bond.

The heating charges of the individual tubes basically can be ignited individually; however, preferably a combined ignition of all heating charges is provided by an appropriate igniter means. This can be done, for example, by means of friction with the use of suitable auxiliary elements, such as, for instance, a rotatable ring igniting a friction-sensitive primer composition covering the heating charges. According to a further embodiment of the invention, the combined ignition takes place, however, preferably by way of an annular igniter cord mounted in the sleeve in such a way that it extends over all open igniter ends of the charge tubes. In the simplest version, an igniter cord on a pyrotechnical basis proved to be advantageous—a so-called gunpowder flash charge—the ends of which are extended for ignition purposes through suitable bores in the sleeve toward the outside. However, it is likewise possible to initiate the combined ignition of all heating elements by means of an electrically heated resistance wire.

Another particularly simple and reliable possibility for combined ignition is provided by a coating covering the open ends of the tubes. That is a thin, annular coating with a pyrotechnical composition is provided which covers the ends of the heating elements on the ignition side. This composition can, for example, fill out the bottom of an annular groove formed at the end face of the sleeve, the axial recesses with heating elements forced therein emanating from this groove. The pyrotechnical composition is ignited, in turn, by means of an ignition cord which is in contact with the composition with one of its ends along a certain distance and which extends with its other end to be ignited out of the sleeve.

To attain a satisfactory welding bond, the sleeve must exert from the outside a specific compressive force in the radial direction on the molded component or components to be welded thereto. This compressive force can be produced, by a certain gas pressure of the burning heating charges. This gas pressure, in turn, can be produced by adding to the heating charge admixtures which are vaporized, decomposed, or burn under the evolution of gas. These admixtures can be, for example, ammonium carbonate, ammonium oxalate, or customary organic binders. The amount of the binder is generally less than 10% by weight. To make the gas pressure effective during the welding period, the sleeve is sealed gastight.

In addition to exerting compressive pressure by the use of gas, or in place of this feature, it is also possible to employ mechanical clamping elements arranged on the outside of the sleeve and effecting a radial compression. Simple clamping straps of the type of a hose clamp are quite readily suitable; these are placed, prior to the welding step, over the sleeve at the level of the heating elements and then tightened. In this connection, it proved to be advantageous to provide slots in the sleeve between the heating elements in the axial direction. These slots are preferably radially oriented and terminate at a spacing from the welding surface. As a result, the tolerances between the sleeve and the molded component are overcome, and consequently the molded component connection is firmed up already before the welding step, and the compressive force can be fully effective on the welding zone. In a modification, the clamp can be provided with a pretensionable spring element. The use of cutouts in the sleeve can be omitted in this case, because due to the elastic clamping strap the softened plastic material of the sleeve is additionally urged against the end of the molded component during the welding process.

Pyrotechnical mixtures generally are to be protected from the effect of moisture. In the welding sleeve connector of this invention, all sleeve parts containing a heating charge are carefully covered. Such covering can be effected, for example, by means of an annular synthetic resin cover profile pressed into an annular groove of the sleeve at its end face, the heating element recesses emanating from this groove. The cover profile can, however, also extend instead on the outside over the end face of the sleeve. The cover profile can be joined to the sleeve in addition to or in place of the shape-mating connection by means of welding or cementing. Another possibility for sealing off the sleeve according to this invention resides in covering same with a sealing compound, e.g. on the basis of polyester resins with filler. The sealing compound can, for example, fill out the annular groove on the end face of the sleeve, after the ignition means has been introduced.

The invention is shown in embodiments in the drawings and will be explained in greater detail below with reference thereto. In the drawings.

Figure 1A:
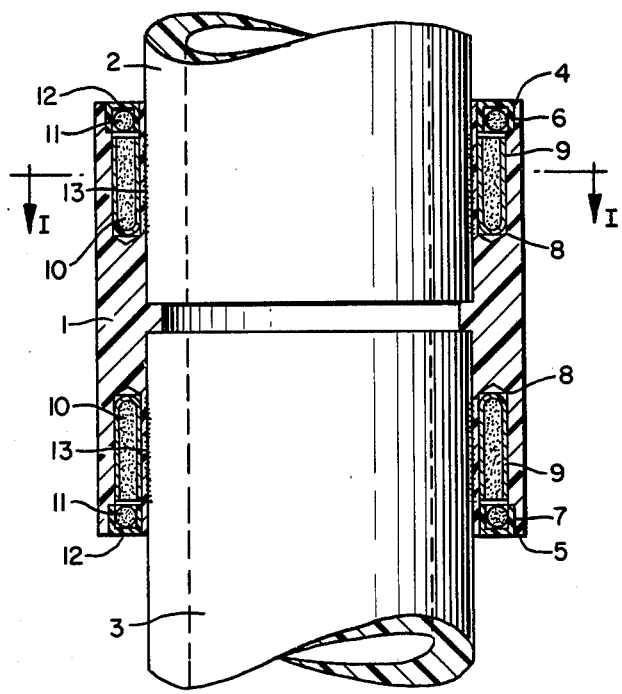
FIGS. 1a and 1b show a sleeve connector for joining two pipe ends.

The sleeve connector or assembly of this invention includes a sleeve 1, shown in a longitudinal section in FIG. 1a that is made of a thermoplastic synthetic resin, for example polyethylene. The sleeve can exhibit a shrinking effect, in that it is radially expanded during manufacture to the intended inner diameter by heating and then is allowed to cool in the expanded condition to obtain a radial welding pressure due to the memory characteristics of the stretched synthetic resin. The sleeve 1 is constructed as a double socket to receive the two pipe ends 2 and 3 of a thermoplastic synthetic resin, for example polyethylene. The sleeve 1 is provided at its two end faces 4, 5 with respectively one annular groove 6, 7 from which emanate the axial bores 8 each having the shape of a blind hole. The unilaterally sealed tubes 9 are inserted without radial clearance in the bores 8. The tubes 9, produced, for example, from a brass alloy with a wall thickness of 1.2 mm., contain the compacted pyrotechnical heating charge 10 which generally reacts with only low evolution of gas during its conversion. The open ends of the tubes 9 adjoin the annular grooves 6, 7 and are covered by the annular igniter cord 11 arranged therein. The heating charges 10 and the igniter cord 11 are covered toward the outside by an annular synthetic resin channel-shaped profile 12 pressed into the annular grooves 6, 7. In this arrangement, one end of the igniter cord 11 is extended toward the outside through a bore, not shown, of the profile 12, so that the cord can be ignited at this end. In a modification of the embodiment shown in FIG. 1a there is also the possibility of mounting the heating charge tube 9 with its open end forward into the sleeve and to effect ignition from the inside in the manner described above. The welding bond or zone 13 between the sleeve 1 and the two ends 2, 3 is indicated by the radial extending lines.

Figure 1B:
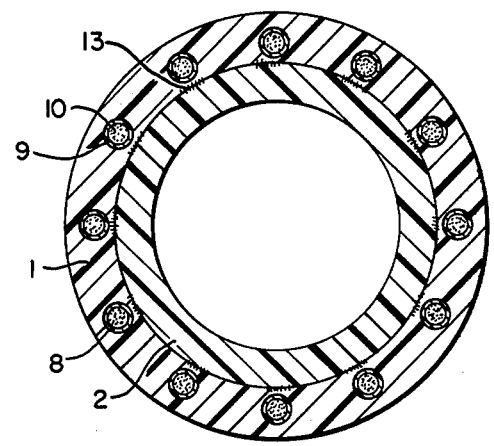

FIG. 1b shows a cross section along line I—I in FIG. 1a and illustrates the tubes 9 in the bores 8, these tubes being uniformly distributed at mutual spacings over the circumference of the sleeve 1; the upper pipe end 2; and the welding zones 13.

Figure 2A:
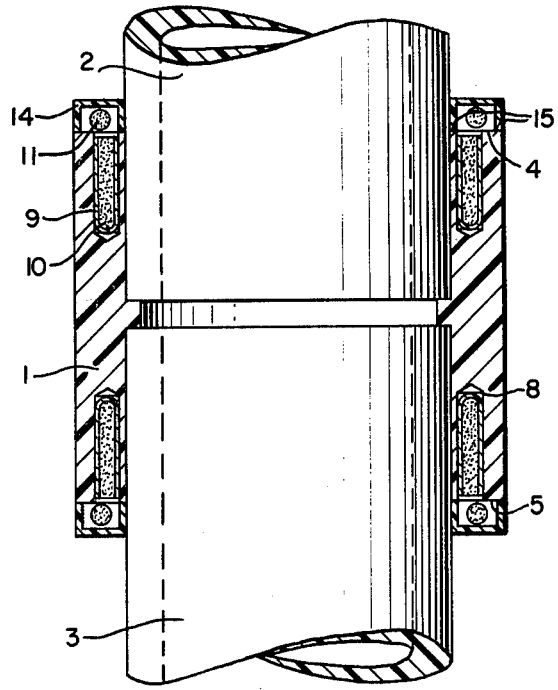
FIGS. 2a and 2b show a modification thereof.

FIG. 2a shows a somewhat modified sleeve construction prior to welding, wherein the heating charges 10 contain a gas-producing additive such as ammonium carbonate to effect during their reaction a contact pressure of the sleeve 1 against the pipe ends 2,3 due to the gas pressure. The sleeve 1 is sealed in a gastight manner by being welded at its end faces 4, 5 to a cover ring 14 made of e.g. polyethylene along the contact rims 15 of the latter. This seal also withstands the internal excess pressure occurring during the combustion of the heating charges 10.

Figure 2B:
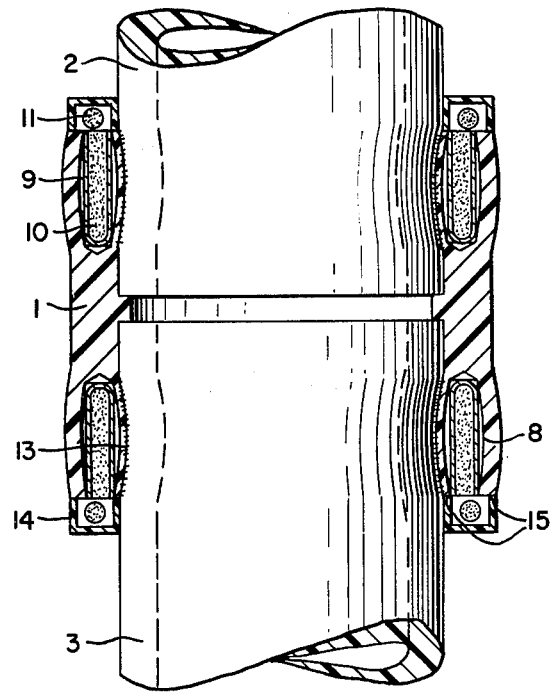

FIG. 2b shows the same sleeve construction as shown in FIG. 2a after welding, wherein, due to the internal excess pressure, small radial expansions have been caused in the bores 8 and a corresponding contact pressure against the pipe ends 2, 3 has been effected in the region of the welding zones 13. The heating charges 10 and the igniter cords 11 now are present in the form of slag residues.

Figure 3A:
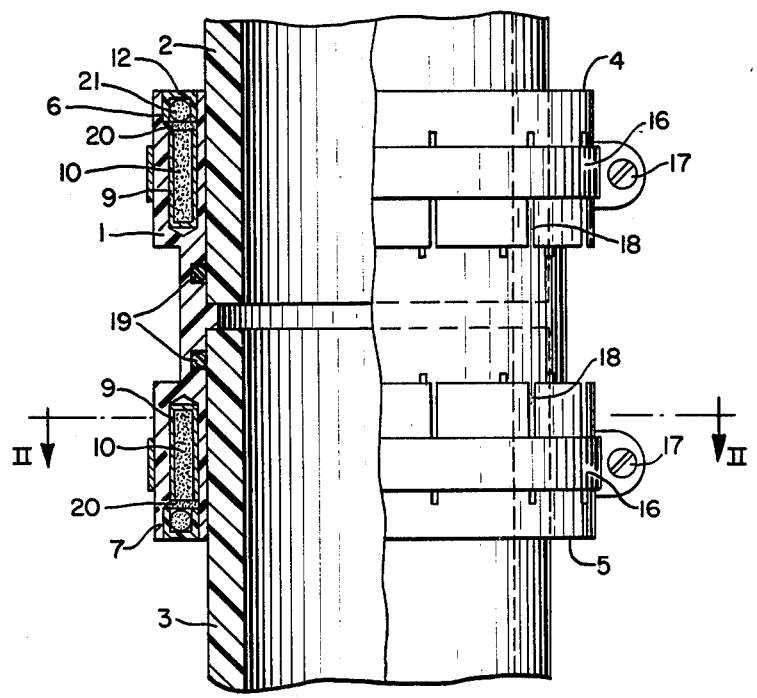
FIGS 3a and 3b show a sleeve connector with external clamping elements.
Figure 3B:
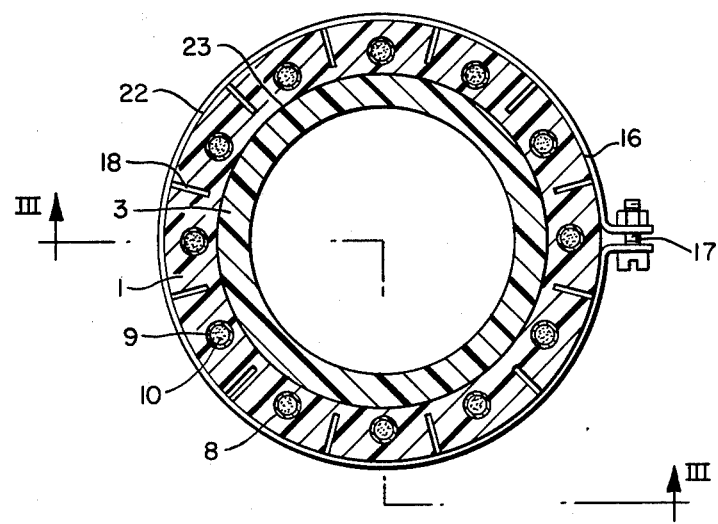

FIG. 3a, finally, shows a sleeve construction in accordance with line III—III in FIG. 3b, wherein the thermoplastic sleeve 1 is surrounded in the zone of the tubes 9 by respectively one clamping strap 16 which can be tensioned by means of screw 17. The sleeve 1, to facilitate contact pressure in the zone of the tubes 9, is provided with the radial cutouts 18 which here terminate at a spacing from the end faces 4, 5. Sealing between the sleeve 1 and the pipe ends 2,3 is accomplished by means of the two sealing rings 19. A pyrotechnical mixture 20 is impressed in a thin, annular layer on the bottom of the annular grooves 6,7; this layer covers the heating charges 10 and can be ignited by means of the end 21 of the igniter cord, contacting this layer.

The two sealing rings 19, associated with respectively one pipe end 2, 3, have proven to be especially advantageous and are preferably also utilized in combination with other sleeves according to this invention.

FIG. 3b, illustrating a section along line II—II in FIG. 3a, clearly shows the radial cutouts 18 between the tubes 9, emanating from the outer wall surface 22 of the sleeve 1 and terminating at a spacing from the inner wall surface 23 thereof.

Sleeve constructions according to FIGS 1a and 1b were tested for their strength on a tension testing machine. The pipes and sleeves were made of polyethylene. The outer diameter of the pipes was 110 mm., the minimum distance between the inner wall surface of the sleeve and the heating charge tubes, i.e. the wall thickness of the supporting part of the sleeve, was 0.5 mm. The number of heating charge tubes distributed over the circumference of the sleeve was varied. The following strength values were obtained:

| Number of Tubes Along Sleeve Circumference | Tear Strength kN |
| --- | --- |
| 20 | 12 |
| 24 | 15 |
| 30 | 19 |
| 40 | <12 |

As was furthermore determined, the wall thickness of the supporting part of the sleeve could be varied between 0.2 mm. and 1.5 mm., without there occurring an undue reduction in strength of the welding bond.

What is claimed is:

1. A welding sleeve connector for the connection of molded components made of a thermoplastic synthetic resin which comprises a thermoplastic sleeve, a plurality of pyrotechnical heating charges for producing welding energy, each charge being individually enclosed in a casing of a solid material arranged in the sleeve, and said heating charges being separately positioned in the sleeve at predetermined spacing from each other over the circumference of the sleeve, and means for igniting said heating charges.

2. A sleeve connector according to claim 1, wherein the casing is a unilaterally sealed tube.

3. A sleeve according to claim 2, wherein the tubes have a ratio of length to outer diameter to wall thickness of about (10 to 40):(4 to 10):1.

4. A sleeve according to claim 2, wherein the tubes are inserted in axially oriented recesses emanating from an end face of the sleeve.

5. A sleeve according to claim 2, wherein the tubes each have an open end and the igniting means for the heating charges comprises an annular igniting means that is common to all of the charges and that is arranged in the zone of the open ends of the tubes.

6. A sleeve according to claim 5, wherein the igniting means is an igniter cord covering the open ends of the tubes.

7. A sleeve according to claim 5, wherein the igniting means is an electrically heatable resistance wire.

8. A sleeve according to claim 5, wherein the igniting means is a coating with a pyrotechnical composition covering the open ends of the tubes.

9. A sleeve according to claim 1, wherein the heating charges contain admixtures producing, during the generation of welding energy, gases effecting a radial contact pressure of the sleeve against a molded component inserted into an end of said sleeve.

10. A sleeve according to claim 1, wherein cutouts are provided in the sleeve between the heating charges, these cutouts emanating from the outer wall surface of the sleeve and terminating at a spacing from the inner wall surface of the sleeve.

* * * * *